United States Patent
Cluck et al.

(10) Patent No.: US 8,984,595 B2
(45) Date of Patent: Mar. 17, 2015

(54) METHOD AND SYSTEM FOR HUB-AND-SPOKE WEBSITE BROWSING AND NAVIGATION ON A MULTIPANED PLATFORM FOR THE COMMUNICATION, DISTRIBUTION, AND COLLABORATION OF INFORMATION AND DATA

(75) Inventors: Robert L. Cluck, Aspen, CO (US); Mikel G. Lowery, Friendswood, TX (US); Toby J. Simmons, Jr., Cypress, TX (US); David Dorsett, Wichita, KS (US)

(73) Assignee: The Aspen Equity Group, Inc., Aspen, CO (US)

( * ) Notice: Subject to any disclaimer, the term of this patent is extended or adjusted under 35 U.S.C. 154(b) by 1156 days.

(21) Appl. No.: 12/240,982

(22) Filed: Sep. 29, 2008
(Under 37 CFR 1.47)

(65) Prior Publication Data
US 2009/0249453 A1    Oct. 1, 2009

Related U.S. Application Data

(60) Provisional application No. 60/975,976, filed on Sep. 28, 2007.

(51) Int. Cl.
*G06F 15/16*    (2006.01)
*H04L 9/32*    (2006.01)
*H04L 29/06*    (2006.01)
*H04L 29/08*    (2006.01)

(52) U.S. Cl.
CPC ............... *H04L 63/10* (2013.01); *H04L 67/02* (2013.01)
USPC ................................................. 726/5; 726/2

(58) Field of Classification Search
CPC ............. H04I 67/02; H04I 67/16; H04I 63/10
USPC ..................................................... 726/1, 2, 3, 5
See application file for complete search history.

(56) References Cited

U.S. PATENT DOCUMENTS

| | | | |
|---|---|---|---|
| 6,313,855 B1 | 11/2001 | Shuping et al. | |
| 6,907,574 B2 | 6/2005 | Xu et al. | |
| 6,922,815 B2 | 7/2005 | Rosen | |
| 6,938,218 B1 | 8/2005 | Rosen | |
| 6,976,210 B1 * | 12/2005 | Silva et al. | 715/205 |
| 7,185,274 B1 | 2/2007 | Rubin et al. | |
| 7,433,885 B2 * | 10/2008 | Jones | 1/1 |
| 8,069,435 B1 * | 11/2011 | Lai | 717/106 |

(Continued)

FOREIGN PATENT DOCUMENTS

WO    WO-2008/034336    3/2008

OTHER PUBLICATIONS

Exploring User Navigation during Online Health Information Seeking; Graham et al, 2006.*

*Primary Examiner* — Luu Pham
*Assistant Examiner* — Jahangir Kabir
(74) *Attorney, Agent, or Firm* — Squire Patton Boggs (US) LLP

(57) ABSTRACT

The invention is a method and system for hub-and-spoke website browsing and navigation on a multipaned platform for the communication, distribution and collaboration of information and data. The invention allows multiple non-collocated users to collaborate on an interface created by a server-based application by utilizing a plurality of application spokes and a plurality of application fasteners to facilitate data exchange between a hub and at least one viewing pane on a display device.

9 Claims, 10 Drawing Sheets

(56) References Cited

U.S. PATENT DOCUMENTS

| | | |
|---|---|---|
| 2004/0230447 A1 | 11/2004 | Schwerin-Wenzel et al. |
| 2006/0031879 A1 | 2/2006 | Colter et al. |
| 2006/0253594 A1* | 11/2006 | Szabo et al. ............ 709/227 |
| 2007/0010800 A1 | 1/2007 | Weitzner et al. |
| 2007/0045961 A1 | 3/2007 | Morris |
| 2007/0239858 A1* | 10/2007 | Banerji et al. ............ 709/220 |
| 2008/0155426 A1 | 6/2008 | Robertson et al. |
| 2009/0006981 A1* | 1/2009 | Pagan ............ 715/752 |

* cited by examiner

Key to Navigation Pane spokes:

Home Page:  myVirtuoso Home
Spoke 1:    myWealthMap
Spoke 2:    myWealthCare
Spoke 3:    myWealthCapital
Spoke 4:    Message Center
Spoke 5:    Calendar
Spoke 6:    To Do List
HUB:        Virtual Safe
Spoke 7:    YellowPad

US 8,984,595 B2

METHOD AND SYSTEM FOR HUB-AND-SPOKE WEBSITE BROWSING AND NAVIGATION ON A MULTIPANED PLATFORM FOR THE COMMUNICATION, DISTRIBUTION, AND COLLABORATION OF INFORMATION AND DATA

PRIORITY CITATION

This application claims the benefit of U.S. Provisional Patent Application No. 60/975,976, fined 28 Sep. 2008.

COPYRIGHT NOTICE

This application includes material that is subject to copyright protection. The copyright owner has no objection to the facsimile protection by anyone of the patent disclosure, as it appears in the United States Patent and Trademark Office files and records, but otherwise reserves all copyright rights whatsoever.

BACKGROUND OF THE INVENTION

1. Field of the Invention

The present invention relates to a method for hub-and-spoke navigation and browsing of a website utilizing multiple and repeatable frames and for allowing multiple non-collocated users to collaborate by using secure internet web-browsers to view shared information through an interface created by a server-based application.

2. Background Information

With the growth of the internet and computer technology, there has arisen a need for people to communicate, collaborate, and share information and advice over the internet. From this need have grown many websites and methods for navigating through internet websites. Methods for communicating over the internet have also emerged. Many of these websites and methods inhibit the collaboration by non-collocated users because of the limits they impose on navigation and on the way information is displayed.

A typical website operates using a linear approach to navigation. This means that a user must start at a homepage and then click through headings and subheadings to obtain the desired information. If the user wants to view other information on the website, the user must back out of the current webpage and begin the linear process of clicking headings and subheadings until the new webpage is reached.

On many websites, this process of backing up and going forward is carried out by shortcut keys that allow the user to perform the multiple steps of backing up and going forward by one click of a button. The process, however, remains the same in that the user is taken back, over a new heading, and then forward to the desired page. The end result is the same linear navigation. It is just carried out in response to a single command rather than multiple tedious commands. This process of website navigation is also commonly referred to as "tabbed browsing", which is discussed in more detail below, and utilizes navigation tabs that remain visible on the webpage.

Many websites are also limited by the type of information that can be accessed on a given page. For example, secure documents are typically stored at a single location that is accessible only by following the linear approach of menu selection—ie., going from heading to subheading, etc. until the secure information is reached. Then to view non-secure information, the user is required to leave the secured webpage and the secured information to follow a path to the non-secure information.

These limitations present a major obstacle to users. Many computer users think in a non-linear format. People will typically address multiple thoughts and ideas at a single time. This process of handling varied information and processing varied information is often referred to as multi-tasking. Additionally, a person might be working with one set of information and be reminded of another task that must be addressed. When using a typical website, a user who is viewing information on the webpage and suddenly decides to address a separate idea or different information must back out of the webpage being viewed and then proceed forward along a different website or application. For example, when using the internet, a user who suddenly decides to send an email must switch between the website being used and the user's email system. The user is faced with the dilemma of either sending the email immediately and possibly losing the information currently being addressed or waiting to send the email until the present task is complete and hope that the user does not forget the email.

Tabbed browsing reflects the industry's attempts to address a user's desire to "multi-task" when using the internet. Tabbed browsing is well known in the art and has been implemented by most internet web browsers, including NetCaptor, IBrowse, Opera, Mozilla, Konqueror, Safari and Internet Explorer. These web browsers utilize a version of tabbed document interface (TDI), which is a graphical user interface that allows multiple documents to be contained within a single window and uses tabs for navigation between those documents. As used by these web browsers, TDI allows a user to multi-task and work on several things simultaneously, but in doing so, the user must navigate away from a tab in order to access another tab. The problem is that the user cannot simultaneously view and interact with multiple tabs.

Another problem is that while TDI allows for multiple views in one window, if a user opens up a certain number of tabs that exceeds the available area of the computer monitor, the tabs jumble and the view becomes cluttered. Some web browsers have attempted to deal with this problem by implementing multi-row tabs that can be opened in one window. However, multi-row tabs further complicate the user's viewing experience. Locating a specific tab in a multi-row tabular interface can be difficult for some users and the dialogue created by multiple tabs can be unusually small, which essentially defeats the purpose of multi-tab viewing, i.e., increasing the accessibility of information to the user.

Typical websites are also limited by the applications that they can perform. A typical website will require the user to have applications loaded onto the user's computer before some information or data can be displayed. This requires the user to download, install and run software before the information can be viewed. The demands of storing and running multiple applications have an adverse effect on the user's computer memory and performance. It also prevents a user from using a computer that does not have these applications installed and on which the user does not have authority to install the applications. That is often the case when using publicly available computers, such as in hotels or libraries, to access information over the internet.

Further, email systems, note systems, scheduling systems, to-do and alert programs, and similar programs typically operate on software that is separate from the webpage. In many instances the use of such systems requires the user to have acquired proprietary application software that is in addition to the user's web-browser. This requires a user to leave the web-browser and access the email program or the note-taking program separately. Usually this requires the user to have multiple applications running on the user's computer at a single time and requires the user to constantly toggle between applications such as a web-browser and an email application.

Various attempts have been made to correct the deficiencies of tabbed browsing. Shuping et al. (U.S. Pat. No. 6,313,855) discloses a web browsing system that contemporaneously displays in a three-dimensional "web browsing room" three web pages, reflective of a user's current web page, a past web page and a future web page within a single window for the user to view. Rubin et al. (U.S. Pat. No. 7,185,274) teaches a system that maintains a navigation history where the user can navigate along various paths based upon the user's past navigation history. Xu et al. (U.S. Pat. No. 6,907,574) discloses a system for navigating between hyperlinks on a webpage within a web browser wherein multiple hyperlinks are simultaneously displayed via the web browser.

In addition, a pair of U.S. patents by Rosen (U.S. Pat. Nos. 6,922,815 and 6,938,218) have disclosed interfaces for viewing web pages and computer files. Specifically, Rosen '815 discloses a computer-implemented system for organizing web pages and other computer files in a three or four dimensional spatial relationship, where one of the files or web pages is "fixed" in its display. Rosen '218 teaches a geometrical organization of web pages or computer files in a viewable matrix of hypercubes.

While the current art cures some of the deficiencies of tabbed browsing and a user's desire to perform "multi-task" computing, it unfortunately fails to solve the problems in such a novel, useful and unobvious way taught by the present invention.

SUMMARY OF THE INVENTION

It is a general object of the present invention to allow users to interact with a website in a non-linear fashion. This will allow users to interact with a website in the somewhat random and varied fashion in which people think.

An additional object of the present invention is to provide a website that allows users the option to simultaneously engage in and view multiple tasks from a single web-page.

A further object of the present invention is to provide a webpage that incorporates varied applications in a single page to avoid the need to switch between web-pages or applications.

An additional object of the present invention is to allow all applications to operate on the server and to be viewed through an internet navigation portal. Thus the user is required to have only internet navigation software installed on the user's computer.

An additional object of the present invention is to provide a common interface to allow for on-line collaboration between two or more non-collocated persons. It is an object of the present invention to allow an unlimited number of non-collocated users to collaborate via the common web-based interface.

An additional object of the present invention is to establish a system that acts as a platform for persons in any client/consulting industry. The system will assist these persons as they advise, develop, educate, execute and manage their respective domains in the marketplace. This dynamic can be expressed as: (1) consultant to client, on a one-to-one basis; (2) consultant to a group of clients, on a one-to-many basis; (3) a consultant group to client, on a many-to-one basis; and (4) a consultant group to many clients; on a many-to-many basis.

An additional object of the present invention is to provide a single webpage that will allow users to view confidential data in multiple formats at a single time by allowing the formats to be displayed in separate panes within a single webpage.

An additional object of the present invention is to allow users to easily create lists such as "to-do" lists, alerts and calendar items that can be manipulated by storing, emailing and key-word searching all within a single, server-based application.

An additional object of the present invention is to allow the users and the administrators of the web-based interface to access and view information in a common format or to access and control the information through a common server-based application.

An additional object of the present invention is to provide the administrators of a secure web-server the ability to upload and download files, view, change and update confidential data, and control, administer and manipulate a client's user account from a single, server-based application.

An additional object of the present invention is to stream a media file from a secure location outside the server web root directly into an embedded player, while also restricting its ability to be saved into the local system or local system cache.

An additional object of the present invention is to provide a communication software hub which records voice, video and computer screen shots with sound from behind a server firewall while engaging the user's local media player with an applet. The communication software hub allows the recorded file to be saved to the user's hub on the website, with the option of distributing the media file through the website.

These and other objects of the present invention are apparent upon inspection of the specification, including the drawings.

DETAILED DESCRIPTION OF THE PREFERRED EMBODIMENT

Figure 1:
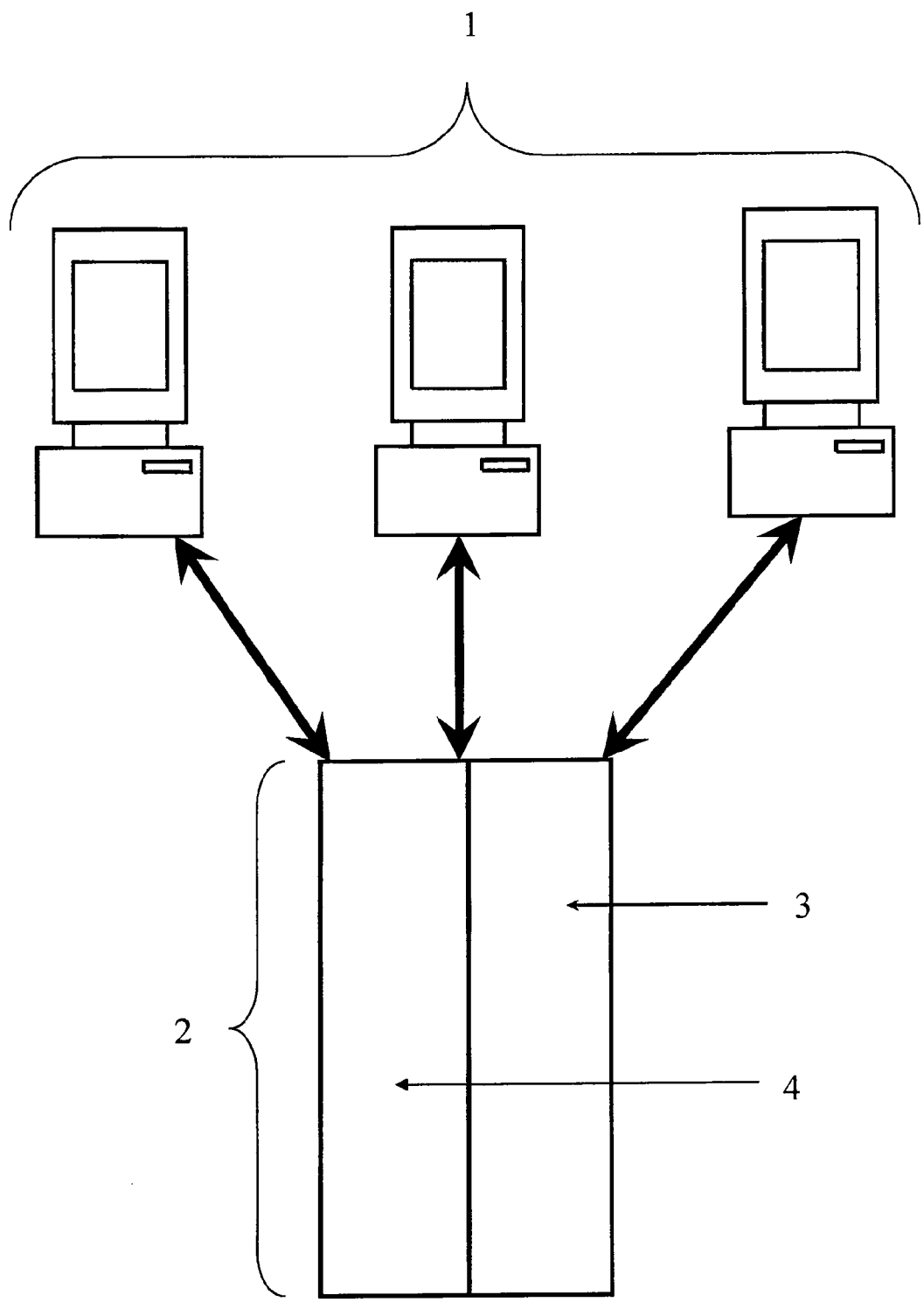
FIG. 1 shows the connectivity of non-collocated users of the present invention.

The present invention comprises a system and methods for the simultaneous viewing of information by multiple authorized users through a web based software. The authorized users can be located at any geographic location and using web based browsing software, the authorized users can see and review information in a common desktop format.

One of the preferred embodiments is comprised of a secured server 2 that contains data 3, preferably confidential data, contained in a plurality of lots. The authorized users 1 access the secured server 2 via any generally available web-browser, such as Internet Explorer, Mozilla Firefox, or Safari by Apple. Once accessed, the secured server 1 launches the server-based application 4, which operates on the server by means of an Active Server Page or similar program. The server-based application 4 operates through programming such as Microsoft ASP, VBscript, JavaScript, Flash player, AJAX Technology, Dynamic HTML, Java Applet, and other similar software and programming that is well known in the art. The server-based application 4 pulls the confidential data 3 into the software hub 5. The confidential data 3 is held in the software hub 5. The spokes 6 of the server-based application 4 contain various features, applications and manipulations that can be performed on the confidential data 3. The authorized users 1 are able to view the confidential data 3 in the form defined by a particular spoke 6 through the fasteners 7. The fasteners 7 then display the confidential data 3 in the desired format to the authorized users 1 through the available web-browser. Thus when an authorized user 1 has selected a particular fastener 7 from a particular spoke 6, the fastener causes the information to be relayed or manipulated to the appropriate web-browser pane, such as a Multi-Format Viewing Pane, shown in FIGS. 4 and 5. The authorized users 1 can also accomplish this relay or manipulation of the confidential data 3 by selecting fasteners 7 for particular spokes 6 from commands displayed in another pane on the web-browser, such as the Quick Pane links pane and the Navigation Pane links pane shown in FIGS. 4 and 5. The functions that are defined by the spokes 6 and the displays that are defined by the fasteners 7 are programmed into the server-based application 4 which is stored on and runs from the secured server 2.

The authorized users 2 are then able to navigate between the spokes 6 and fasteners 7 by means of commands 8 contained on the server-based application 2 and displayed to the users via the available web-browser. Clicking on these commands 8 causes the display of the confidential information to be rotated to the newly chosen spoke 6 and displayed by the newly chosen fastener 7. In this way, an authorized user 1 is able to quickly switch from one manipulation of the confidential data 3 to an alternative manipulation or display of the confidential data 3. The commands 8 for switching between spokes 6 remain displayed on the available web-browser and allow the authorized users 1 to quickly and conveniently switch to alternative applications, manipulations and functions of the server-based application 4, much like traveling along the rim of a wheel. Navigation in this forward sense can also occur in a backwards sense (directly through the spokes and fasteners back into the hub to view immediately prior selected information) and through leaps, to view information not immediately prior selected, but accessed at some point during the user's visit to the website.

Figure 3:
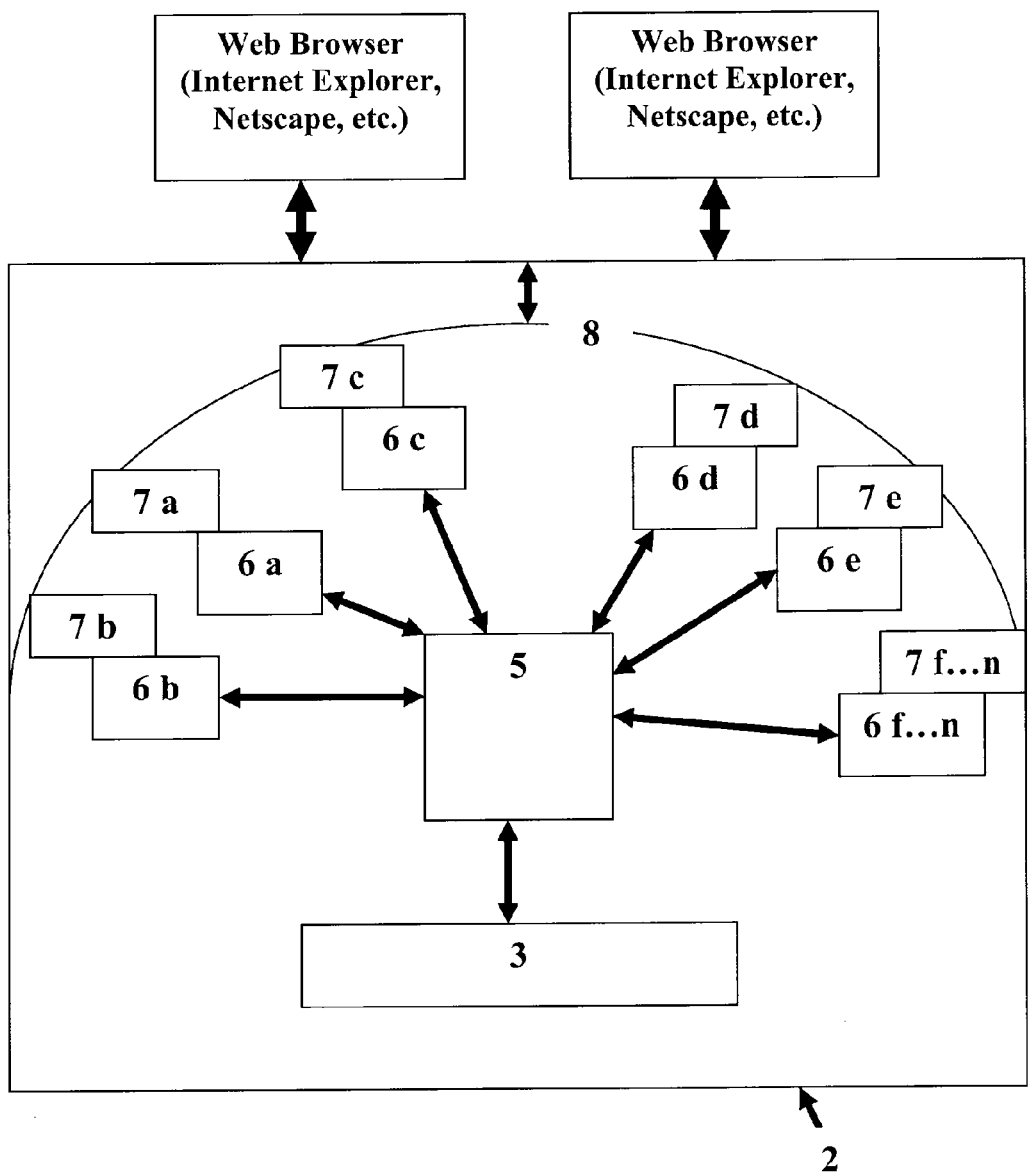
FIG. 3 shows an additional schematic arrangement of the present invention including user access and the hub-and-spoke arrangement of the present invention.

Additional embodiments of the present invention can contain varying numbers of spokes 6. As represented by the ellipsis in FIG. 3, the present invention can contain an unlimited number of spokes 6 and fasteners 7. FIG. 3 contains ellipsis and one spoke 6 named "Spoke X" to denote the fact that the server-based application 4 can contain an unlimited number of spokes 6 and fasteners 7, with each performing its desired function, manipulation, and view of the confidential data 3.

Figure 5:
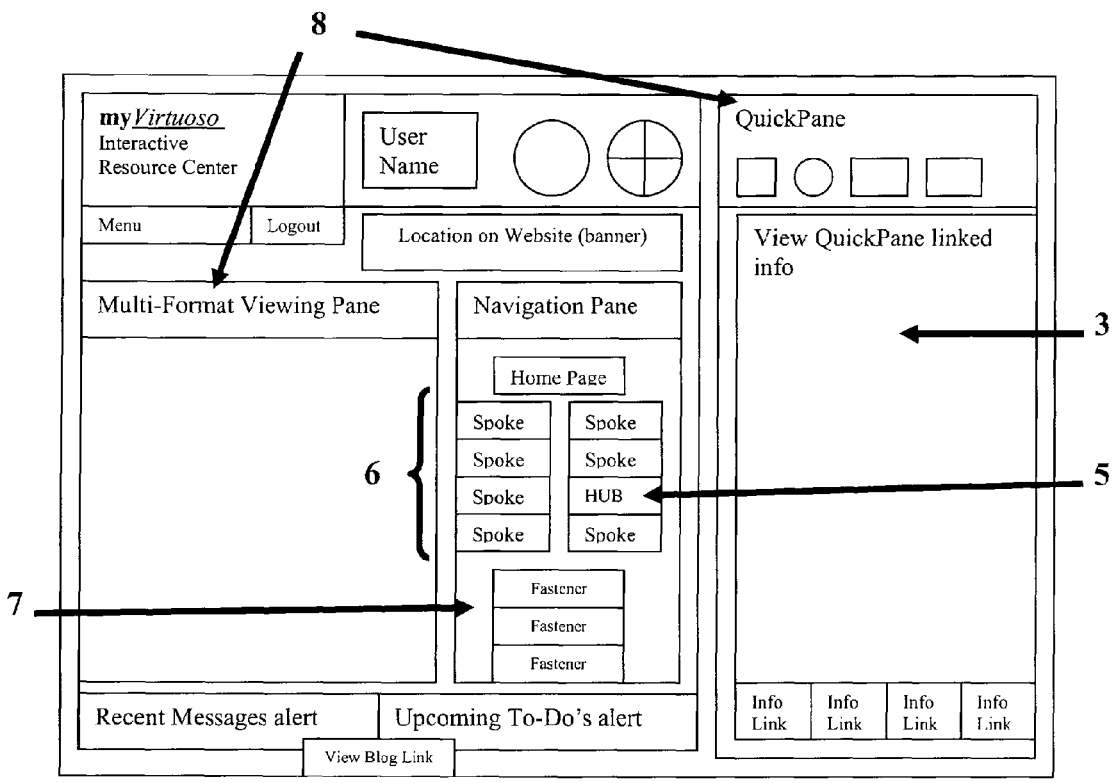
FIG. 5 shows a Microsoft Internet Explorer display of one embodiment of the present invention.

In an additional embodiment of the present invention shown in FIG. 5, an example of the confidential data 3 is that which contains financial and personal information related to an individual client. The client and other authorized users 1 can access the confidential information 3 and the server-based application 4 by means of a secure internet connection that utilizes a user identification and a password to access the secured server 2. Once properly accessed, the client's confidential information 3 is pulled into the hub 5 of the server-based application 4. Authorized users can then view the client's financial information through fasteners 7 that connect a spoke 6 to the rim 8. These fasteners 7 work in conjunction with the spokes 6 to display the confidential information 3 in a pre-determined format—such as by progress toward pre-determined financial goals or current investment portfolio performance. The user can quickly choose a spoke 6 such as an email spoke that displays an email fastener 7 on the available web-browser. This email spoke 6 then utilizes the user's confidential data 3 to identify the recipient or sender of the email. An additional spoke 6 can be accessed that displays a calendar fastener 7 that uses the confidential data 3 to be particular to the confidential data 3. An alternative spoke 6 can display a "to-do list" fastener 7 in the same way. In this manner, the server-based application 4 can contain multiple features relevant for the clients of financial advisors. In this embodiment of the invention, the server-based application 4 has spokes 6 with the following titles: myWealthMap, which defines an authorized user's 1 values and aspirations; myWealthCare, which defines an authorized user's 1 progress toward pre-determined financial goals; myWealthCapital, which defines an authorized user's 1 present financial portfolio; To Do List, which lists tasks and objectives the authorized user wants to accomplish and can be created by the client or an administrator; MessageCenter, which is a secure email system for the client; Calendar, which is a secure calendar for the client and advisor/consultant; and YellowPad, which is a spoke 6 that permits online creation, emailing, storing and searching of notes. All of these spokes operate in conjunction with and pull information from the Virtual Safe, which is the hub of this embodiment of the present invention. This embodiment of the present invention is displayed via an Internet Explorer web-browser in FIG. 5.

Figure 2:
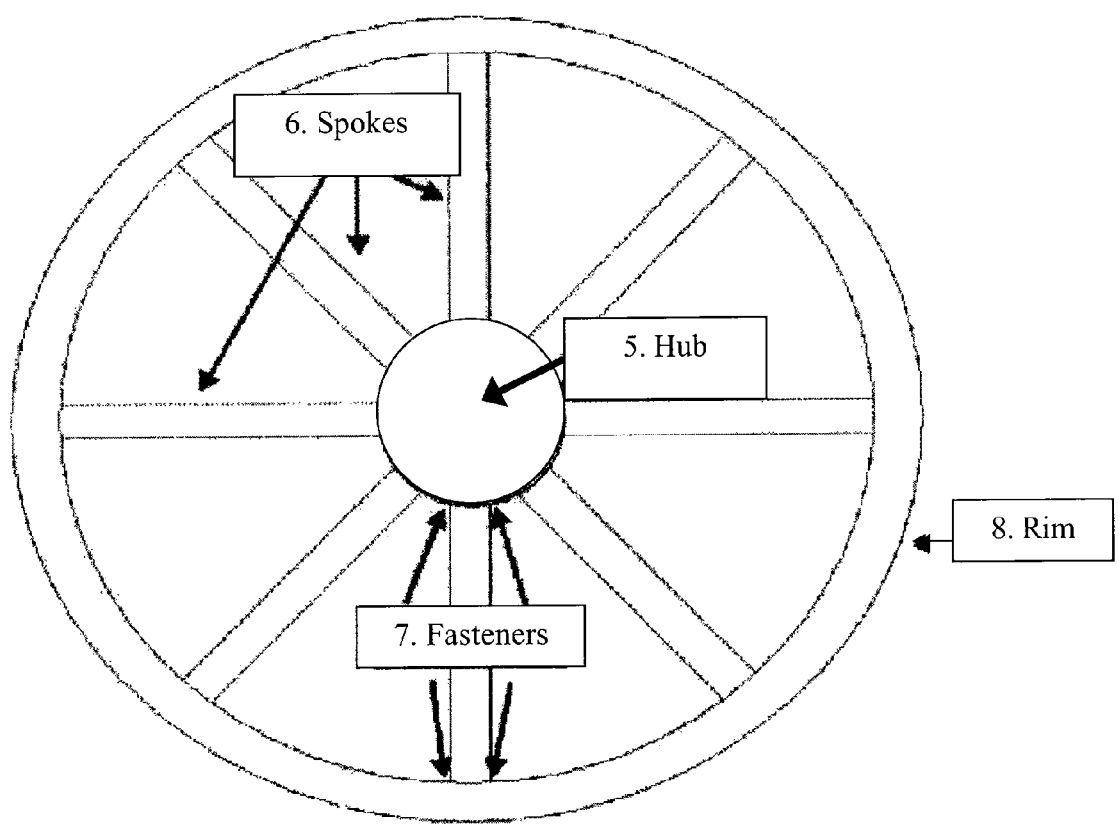
FIG. 2 shows a graphical representation of the hub-and-spoke arrangement of the present invention.
Figure 4:
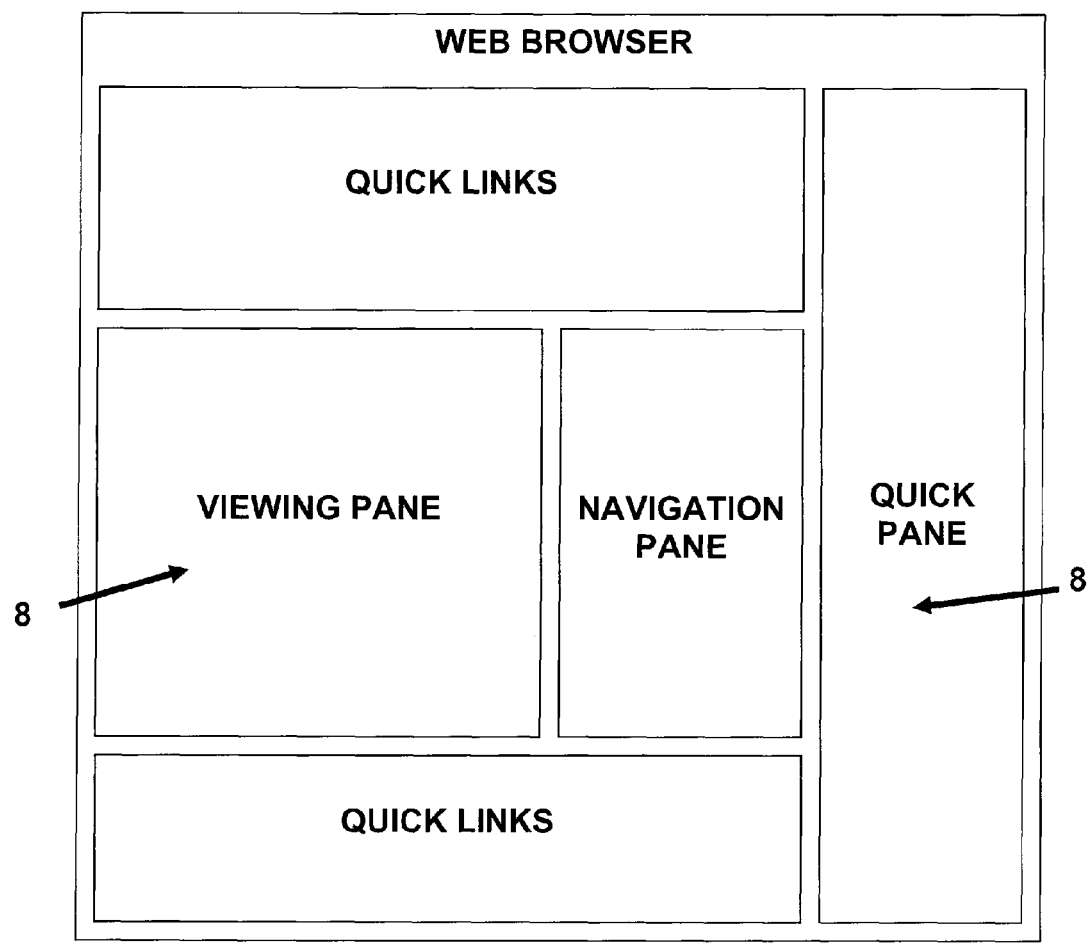
FIG. 4 shows a layout of a web-browser display of one embodiment of the present invention.

In the embodiment displayed in FIG. 4, the user views the operation of the server-based application 4 through spokes 6 that are displayed in panes on a typical web-browser program. A Navigation Pane of the web-browser shown in FIG. 4 displays the available spokes 6 of the server-based application 4, to which the user can quickly navigate. This pane comprises the rim 8 that is displayed in FIG. 2 and that is the simple connectivity between the various spokes 6 of the server-based application 4. Upon selecting a spoke 6 in the Navigation Pane, the Viewing Pane shown in FIG. 4 displays the fastener that relates to the chosen spoke 6. The Quick Pane shown in FIG. 4 then displays an additional fastener 7 that contains information about the chosen spoke 6. Navigation within the Quick Pane is still available without navigating away from the existing spoke that was engaged. Any work previously performed will be saved by the website when navigating back within the QuickPane.

Figure 6:
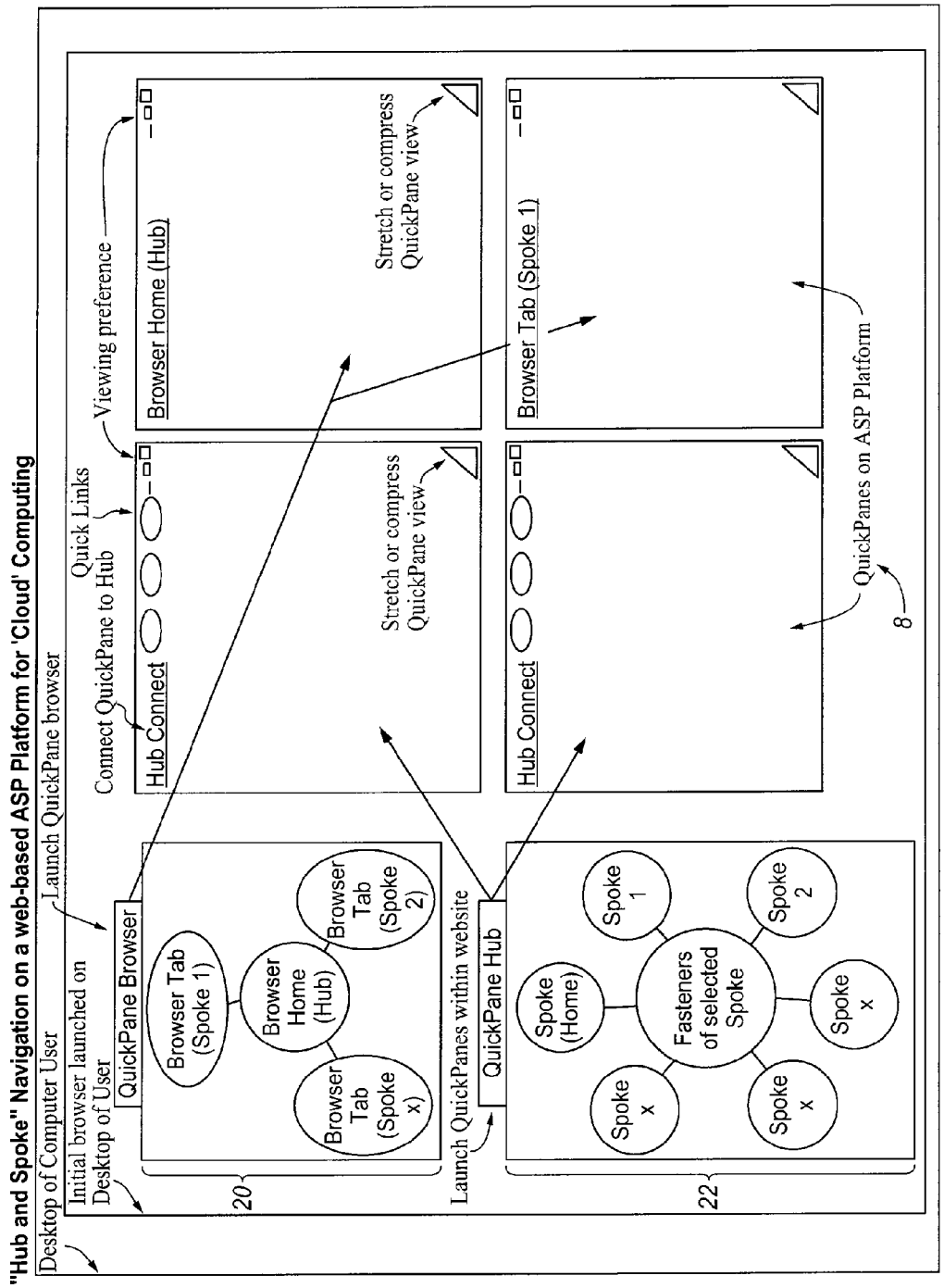
FIG. 6 shows a schematic arrangement of the present invention on a web-based ASP platform for cloud computing.

In an additional embodiment displayed in FIG. 6, hub-and-spoke navigation on a web-based ASP platform for "cloud" computing is shown on a user's display device. FIG. 6 shows the preferred embodiment for viewing the display device layout after a user has launched a web browser and logged in to an ASP platform. Browser hub-and-spoke 20, for navigating between 8 multiple websites and shown with one hub and three spokes for illustrative purposes, may be comprised of an unlimited number of spokes. Clicking on any of the hub or spokes of browser hub-and-spoke 20 will cause information to be displayed in at least one viewing pane (QuickPane) on the display device. Website hub-and-spoke 22, for navigating within a single website and shown with one fastener and six spokes for illustrative purposes, may be comprised of a fastener and an unlimited number of spokes. Clicking on any of the fastener or spokes of website hub-and-spoke 22 will cause information to be displayed in at least one viewing pane (QuickPane) on the display device.

Figure 7:
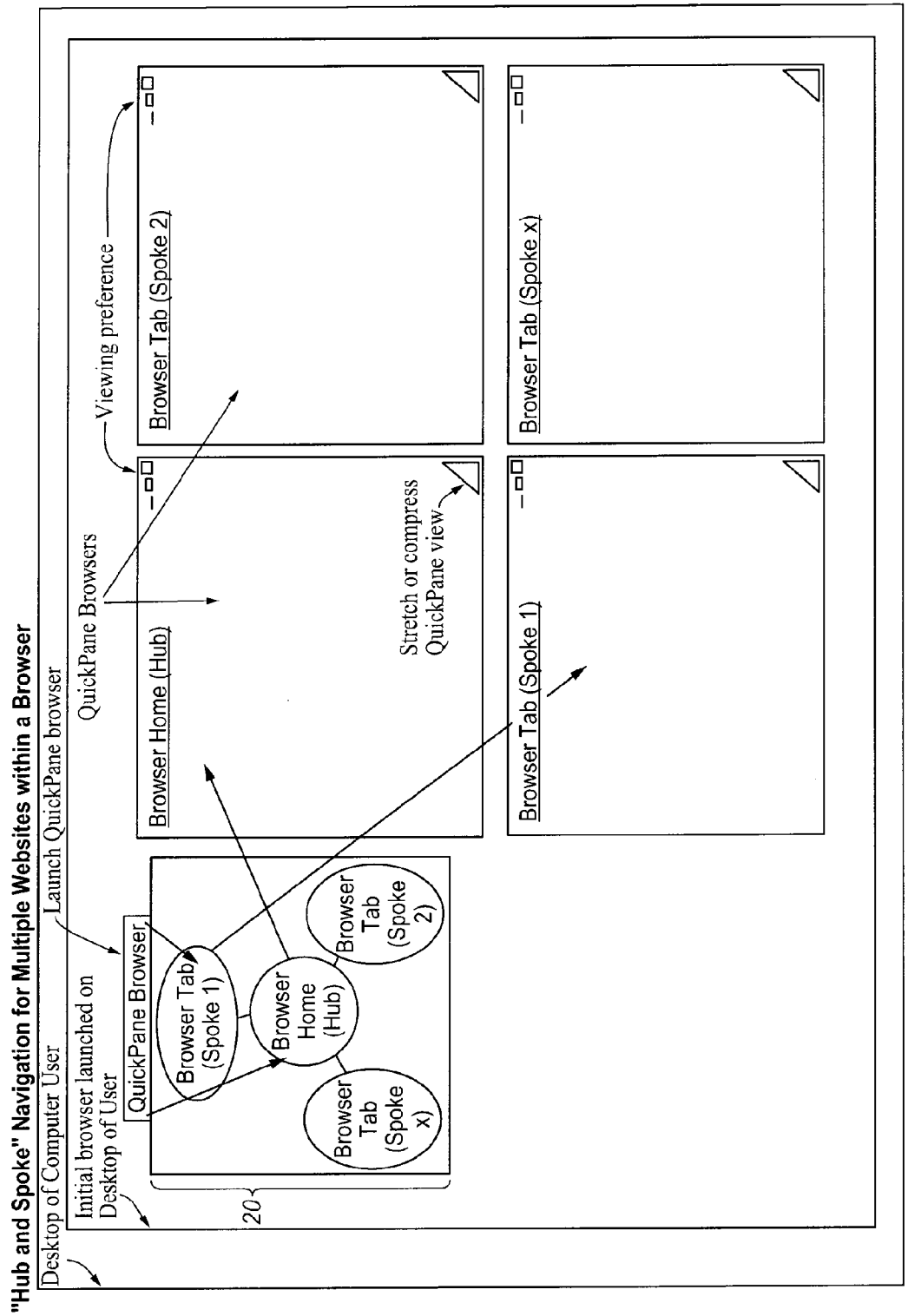
FIG. 7 shows a schematic arrangement of the present invention for multiple websites within a browser.

An additional embodiment shown in FIG. 7 illustrates hub-and-spoke navigation for multiple websites within a browser on a user's display device utilizing multiple viewing panes.

Figure 8:
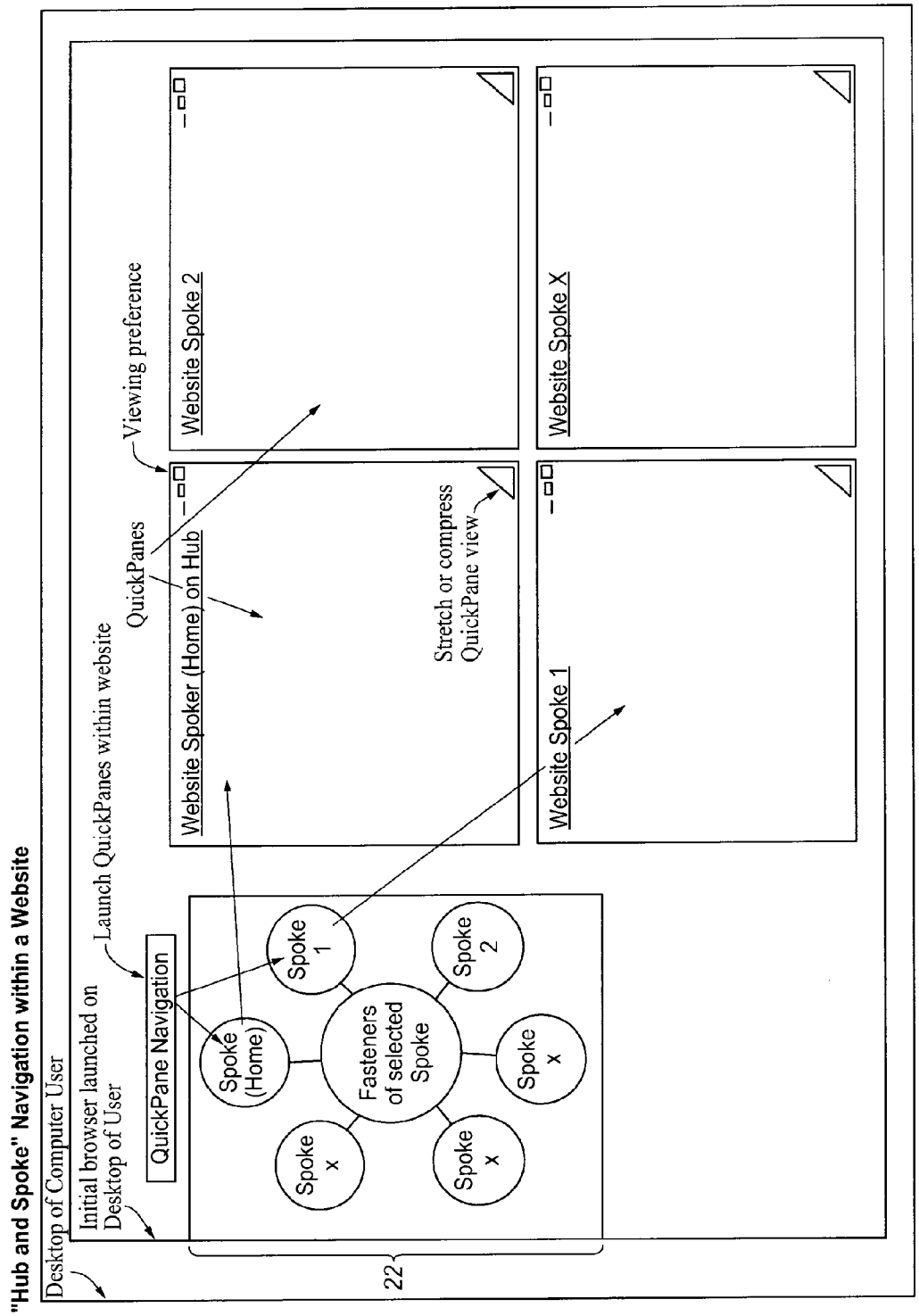
FIG. 8 shows a schematic arrangement of the present invention for navigation within a 8 single website.

An additional embodiment shown in FIG. 8 illustrates hub-and-spoke navigation within a single website on a user's display device utilizing multiple viewing panes.

An additional embodiment of the present invention allows for electronic mail exchange. Emails can be transmitted internally within the website's email system or externally outside the website's email system.

An additional embodiment of the present invention contains file-transfer functionality for authorized users 1 who are administrators for the secure server 2. This functionality allows administrators and users within the system to upload, download or delete files to the hub 5 through a file transfer protocol ("FTP") spoke that is programmed into the server-based application 4. This FTP allows administrators to deposit and manage files directly into the authorized user's confidential data 3. These files can be of a type that the authorized user 1 can view through the web-browser using the appropriate spoke 6 and fastener 7, the files can be downloaded to the authorized user's 1 computer and viewed using readily available software such as Adobe Reader, Microsoft Word or Windows Media Player, the files can be shared with other non-collocated users, the files can be attached to emails and distributed internally within the email system, or the files can even be externally transmitted via email outside the email system to any email recipient. The files can be any transferable file.

An additional embodiment of the present invention contains a spoke 6 that is a secure Wiki file to allow authorized users 1 who are administrators for the secure server 2 to build, modify and maintain a knowledge database of specific information. The specific information stored on this spoke 6 can be any information that authorized users 1 who are administrators believe will be important and needed at future times. Being a Wiki file, the information manipulated by this spoke can be added to, modified and maintained by any authorized user 1 who is an administrator. As with all of the spokes 6 of the present invention, this Wiki file is contained in and operated by the server-based application 4.

Figure 9:
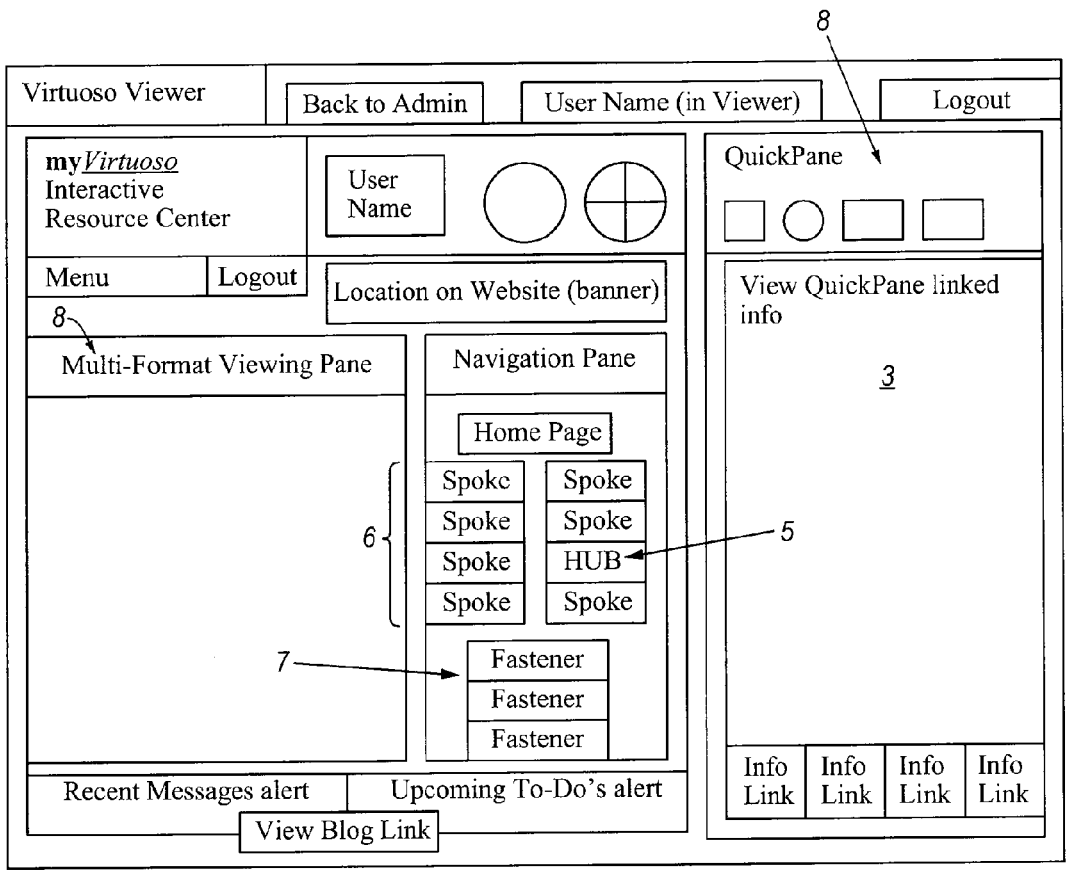
FIG. 9 shows a layout of a web-browser display of another embodiment of the present invention.

An additional embodiment of the present invention contains spokes 6 and fasteners 7 that create views that are specific for authorized users 1 who are administrators of the secure server 2. These spokes 6 and fasteners 7 permit this class of authorized users 1 to view or administer all date or event specific confidential data 3 as well as administration of specific global data at one time and in a single display or Master View. An alternative version of such a spoke 6 and fastener 7 permits this class of authorized users 1 to view the same information in the same format and layout that any other authorized user 1 sees. With such a spoke 6 and fastener 7, the authorized user 1 is also an administrator of the secure server 2 can view the confidential data 3 in the exact same way that a non-administrator authorized user 1 views it. As shown in FIG. 9, in this embodiment, the "Virtuoso Viewer" displays the confidential data 3 for viewing by an administrator or an authorized user 1. Such a spoke 6 and fastener 7 makes online collaboration and communication simpler and easier as all of the non-collocated authorized users 1 will be viewing the same thing. All of these spokes 6 and fasteners 7 are part of and programmed into the server-based application 4.

In one embodiment of the present invention, one spoke 6, depicted as the "Yellow Pad" in FIG. 5, permits the authorized user 1 to create lists, notes, archive weblinks or message center emails. In this embodiment of the present invention, the server-based application allows the user to quickly and easily create notes that can be stored, searched by key-words and emailed to others. In this embodiment of the present invention, the "Yellow Pad" is contained and executed by the server-based application 4 and not as a separate and independent program. In that way, the "Yellow Pad" operates as a spoke 6 of the overall invention.

Figure 10:
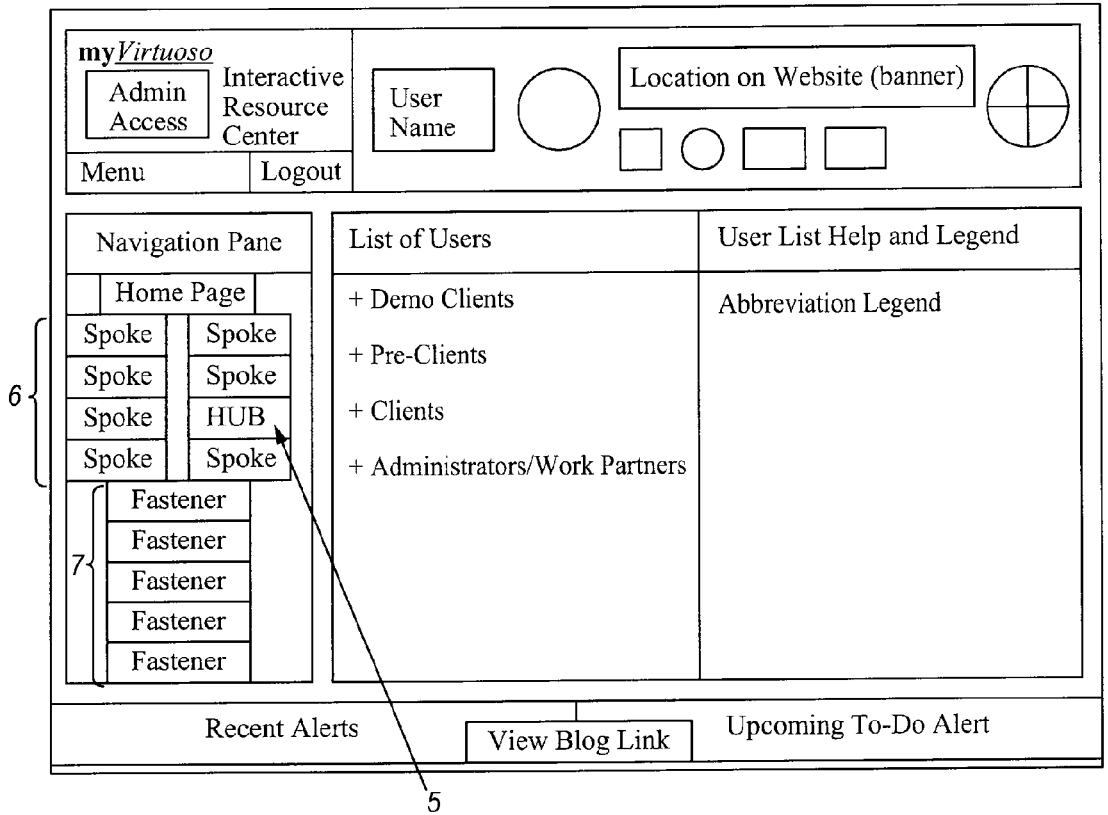
FIG. 10 shows a Microsoft Internet Explorer display of an administrator's view of the present invention.

In yet another embodiment of the present invention, an administrator can perform various functions relating to the server-based application and software hub. These functions include, but are not limited to, managing website user permission and access, maintaining a Wiki central knowledge base, globally managing the server-application's email and instant messaging, overseeing user data aggregation and distribution, establishing a "master view" of all simultaneously interacting users on the website, establishing scripts for automated loading and posting of user-related confidential information, managing a library of files and maintaining a website blog. FIG. 10 shows the application fasteners with these administrator functions.

The preferred embodiment of the web browser display of the present invention is shown in FIG. 5. FIG. 5 displays the Navigation Pane, the Viewing Pane, the Quick Pane, and the other shortcut functions that an authorized user 1 would see when accessing the server-based application 4 via Microsoft Internet Explorer. In addition, as shown in FIG. 5, the preferred embodiment of the present invention contemplates that the information can be viewed simultaneously by a user in multiple viewing panes on the display screen.

Additional embodiments of the present invention can be used to allow remotely located authorized users 1 to access, view, and manipulate confidential data 3 contained on the software hub. The present invention is relevant and can be made to operate for any set of users who wish to access and view confidential data 3 using any available web browser.

The present invention is highly useful when the authorized users 1 are not collocated, but wish to discuss and view confidential data 3 through any available web browser, and using the server-based application 4 they can communicate regarding the confidential data 3. The present invention would also allow the authorized users 1 to simultaneously view the confidential data 3 from geographically diverse locations and discuss the confidential data 3 through telephonic or other communication modes.

Thus, a system and methods have been shown that would allow users to navigate internet locations in a non-linear format. The system and methods disclosed demonstrate the use of a hub-and-spoke arrangement to allow users to view, manipulate and communicate about confidential data by accessing any available web browser and by utilizing multiple and repeatable interactive frames on the web browser.

Although the present invention has been described with reference to specific embodiments, this description is not meant to be construed in a limited sense. Various modifications of the disclosed embodiments of the present invention will become apparent to persons skilled in the art upon the reference to the description of the invention. It is, therefore, contemplated that the appended claims will cover such modifications that fall within the scope of the present invention.

What is claimed is:

1. A method for browsing and navigating a web-based interface on a user display device comprising the steps of:
accessing a server which contains a first lot of data via a web browser;
launching a server-based application;
transferring, by the server-based application, the first lot of data into a software hub of said server-based application;
wherein the first lot of data is selected from the group consisting of media data, weblink data, email data, calendar data, to-do data, financial data, note pad data, values and goals data, financial planning data, portfolio planning and management data, and combinations thereof;
relaying, utilizing a plurality of application spokes, the first lot of data from the software hub through a plurality of fasteners, each of which are connected to one of the application spokes, to at least one user;
converting, by each set of application spokes and associated fasteners, the first lot of data into a user's desired format, whereby the plurality of application spokes and associated fasteners are continuously displayed on the user's display device;
wherein the user's desired format is selected from the group consisting of media file formats, weblink formats, email formats, calendar formats, financial data formats, to-do data formats, note pad data formats, values and goals data formats, financial planning data formats, portfolio planning and management data formats, and combinations thereof;
displaying the first lot of data on the user display device through the fastener associated with the user-selected application spoke, whereby the fastener relays the first lot of data to at least one viewing pane on the user display device;
commanding the server-based application to switch among the plurality of application spokes displayed on the user display device, whereby the first lot of data stored in the hub is then instantly displayed in the viewing pane on the user display device in the format associated with the selected spoke, wherein the commanding is triggered by commands displayed on the web browser and the commands are actuated by the user;
maintaining a non-linear relationship between the plurality of application spokes and the non-linear relationship in that each one of the plurality of application spokes relates back to the hub and each one of the plurality of application spokes is a unique presentation of the first lot of data; and wherein the commands are contained in a navigation pane, and the navigation pane and the viewing pane are displayed simultaneously wherein the plurality of application spokes and associated fasteners that are continuously displayed on the user's display device are the commands; and
wherein the first lot of data is accessed after successfully authenticating user identification and a password to login to a secured server over the internet.

2. The method of claim 1 further comprising a plurality of lots of confidential data.

3. The method of claim 1 wherein the server is secure and password-protected.

4. The method of claim 1 wherein the plurality of application spokes comprise a group consisting of an email application spoke, a calendar application spoke, a to-do application spoke, and a note pad application spoke.

5. The method of claim 4 wherein the plurality of fasteners comprise a group consisting of an email fastener, a calendar fastener, a to-do fastener, and a note pad fastener.

6. The method of claim 1 wherein the plurality of application spokes comprises a group consisting of a strategic development application spoke, a financial planning application spoke and a portfolio planning and management application spoke.

7. The method of claim 6 wherein the plurality of fasteners comprise a group consisting of a strategic development fastener, a financial planning fastener, and a portfolio planning and management fastener.

8. The method of claim 1 further comprising:
uploading confidential data into the secure server via a web browser through a server-based application that transfers the data through a file-transfer protocol application spoke into the software hub.

9. The method of claim 1 wherein the user may manipulate data in one of the plurality of application spokes, and this manipulation affects the first lot of data.

* * * * *